(12) United States Patent
Adelman et al.

(10) Patent No.: US 8,551,432 B2
(45) Date of Patent: Oct. 8, 2013

(54) SYSTEM AND METHOD FOR INJECTING AMMONIA INTO AN EXHAUST GAS STREAM

(75) Inventors: Brad J. Adelman, Chicago, IL (US); Vadim Olegovich Strots, Forest Park, IL (US); Shyam Santhanam, Aurora, IL (US)

(73) Assignee: International Engine Intellectual Property Company, LLC., Lisle, IL (US)

(*) Notice: Subject to any disclaimer, the term of this patent is extended or adjusted under 35 U.S.C. 154(b) by 0 days.

(21) Appl. No.: 13/702,069

(22) PCT Filed: Jun. 4, 2010

(86) PCT No.: PCT/US2010/037366
§ 371 (c)(1),
(2), (4) Date: Dec. 4, 2012

(87) PCT Pub. No.: WO2011/152830
PCT Pub. Date: Dec. 8, 2011

(65) Prior Publication Data
US 2013/0171050 A1 Jul. 4, 2013

(51) Int. Cl.
*B01D 53/94* (2006.01)
*F01N 3/035* (2006.01)
*F01N 3/18* (2006.01)

(52) U.S. Cl.
USPC ............... 423/212; 423/213.2; 423/213.7; 423/215.5; 60/295; 60/299; 60/301; 422/105; 422/111; 700/266; 700/271

(58) Field of Classification Search
USPC ........... 423/212, 213.2, 213.7, 215.5; 60/295, 60/299, 301; 422/105, 111; 700/266, 271
See application file for complete search history.

(56) References Cited

U.S. PATENT DOCUMENTS

| | | | |
|---|---|---|---|
| 2005/0031514 A1* | 2/2005 | Patchett et al. | 423/239.2 |
| 2009/0255241 A1* | 10/2009 | Patchett et al. | 60/301 |
| 2010/0180580 A1* | 7/2010 | Boorse et al. | 60/297 |
| 2010/0269491 A1* | 10/2010 | Boorse et al. | 60/295 |

* cited by examiner

*Primary Examiner* — Timothy Vanoy
(74) *Attorney, Agent, or Firm* — Jeffrey P. Calfa; Mark C. Bach

(57) ABSTRACT

A method for injecting ammonia into an exhaust gas stream downstream of a diesel engine includes providing an exhaust gas passageway (11) from the diesel engine to an ambient (14). The exhaust gas passageway (11) includes an NOx Slip Catalyst (NSC) 20 downstream of an NOx Particulate Filter (NPF) 18. The method includes emitting exhaust gas (EG) through the exhaust gas passageway (11), and selectively injecting ammonia (NH3) upstream of the NPF 18, upstream of the NSC (20), both upstream of the NPF and the NSC, or not injecting ammonia, depending on the temperature of the exhaust gas at the NPF and at the NSC.

20 Claims, 1 Drawing Sheet

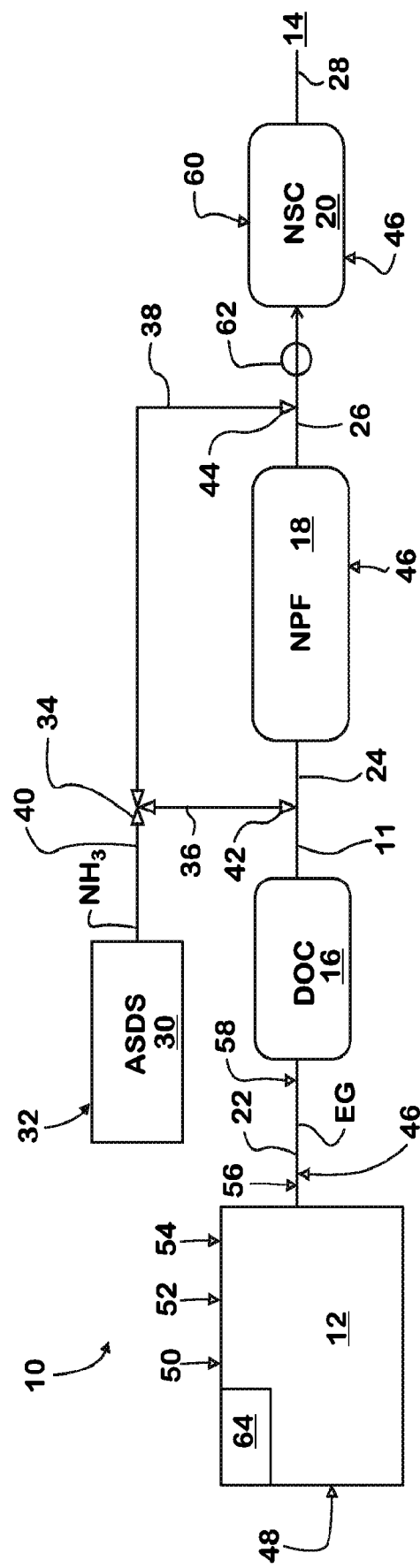

SYSTEM AND METHOD FOR INJECTING AMMONIA INTO AN EXHAUST GAS STREAM

BACKGROUND

Embodiments described herein relate to a system and method for injecting an emission liquid reductant into a gas stream, and more particularly, to a system and method for injecting ammonia into an exhaust gas stream of a diesel engine.

Diesel engine combustion results in the formation of nitrogen oxides, ($NO_x$), in the exhaust gas. Aftertreatment systems, typically selective catalytic reduction systems (SCR systems) are used to reduce oxides of Nitrogen ($NO_x$) emitted from engines. Nitrogen oxides can be reduced by ammonia ($NH_3$), yielding $N_2$, $H_2O$ and $CO_2$. In the aftertreatment process, NOx reacts with the ammonia, which is injected into the exhaust gas stream upstream of an SCR Catalyst.

The aftertreatment process requires control of the ammonia injecting rate. An insufficient injection may result in low NOx conversions, and an injection rate that is too high may result in release of ammonia to the atmosphere, known as ammonia slip. The ammonia slip increases at higher NH3/NOx ratios. The ammonia injection depends on the injection characteristics and the energy of the exhaust gas. If the ammonia is improperly dosed with respect to the amount, the timing, the temperature, the space velocity, the current storage level and the NOx mass flow, ammonia slippage may result.

SUMMARY

A method for injecting ammonia into an exhaust gas stream downstream of a diesel engine includes providing an exhaust gas passageway from the diesel engine to an ambient. The exhaust gas passageway includes an NOx Slip Catalyst (NSC) downstream of an NOx Particulate Filter (NPF). The method includes emitting exhaust gas through the exhaust gas passageway, and selectively injecting ammonia upstream of the NPF, upstream of the NSC, both upstream of the NPF and upstream of the NSC or not injecting ammonia, depending on the temperature of the exhaust gas at the NPF and the temperature of the exhaust gas at the NSC.

Another method for injecting ammonia into an exhaust gas stream downstream of a diesel engine includes providing an exhaust gas passageway from the diesel engine to an ambient. The exhaust gas passageway includes a diesel oxidation catalyst (DOC), an NOx Particulate Filter (NPF) downstream from the DOC, and an NOx Slip Catalyst (NSC) downstream of the NPF. The method includes emitting exhaust gas through the exhaust gas passageway from the diesel engine to the ambient, storing ammonia at an ammonia storage device (ASDS), and actuating at least one delivery valve to selectively permit the flow of ammonia to either a first delivery passageway or to a second delivery passageway. The method further includes the step of injecting ammonia upstream of the NPF, upstream of the NSC, both upstream of the NPF and upstream of the NSC or not injecting ammonia, An aftertreatment system for injecting ammonia into an exhaust gas stream downstream of a diesel engine includes an exhaust gas passageway for the flow of exhaust gas from the diesel engine to an ambient. The exhaust gas passageway includes an NOx Slip Catalyst (NSC) in fluid communication with and downstream from an NOx Particulate Filter (NPF). An ammonia delivery system is in fluid communication with the exhaust gas passageway and includes an ammonia storage device (ASD) and at least one delivery valve. The at least one delivery valve selectively permits the flow of ammonia from the storage device to either upstream of the NPF or upstream of the NSC depending on the temperature of the exhaust gas at the NPF.

BRIEF DESCRIPTION OF THE DRAWINGS

FIG. 1 is a flow diagram showing an aftertreatment system and method of injecting ammonia into an exhaust gas stream of a diesel engine.

DETAILED DESCRIPTION

Referring to FIG. 1, an aftertreatment system and method for injecting ammonia into an exhaust gas stream (EG) of a diesel engine is indicated generally at 10. Although the following description will be directed to an aftertreatment system 10 and method for injecting ammonia downstream of a diesel engine 12 of a vehicle, the system and method of FIG. 1 can be used with any diesel engine that emits NOx.

When the diesel engine 12 combusts diesel, nitrogen oxides form and are released with the exhaust gas (EG). Nitrogen oxides, NOx, are a pollutant that are reduced in the aftertreatment system 10 by ammonia ($NH_3$) resulting in the emission of less harmful nitrogen, $N_2$, water, $H_2O$, and carbon dioxide, $CO_2$.

The aftertreatment system 10 includes an exhaust gas passageway 11. In the downstream direction of the flow of exhaust gas (EG) from the engine 12 to an ambient 14, the exhaust gas passageway 11 includes a diesel oxidation catalyst (DOC) 16, an NOx Particulate Filter (NPF) 18, and an NOx Slip Catalyst (NSC) 20. A first pipe 22 provides the fluid communication of exhaust gas EG between the engine 12 and the DOC 16, a second pipe 24 provides the fluid communication of exhaust gas between the DOC 16 and the NPF 18, a third pipe 26 provides the fluid communication of exhaust gas between the NPF 18 and the NSC 20, and a fourth pipe 28 provides the fluid communication of exhaust gas from the NSC 20 to the ambient 14.

An ammonia storage device (ASD) 30 located on an ammonia delivery system 32 is in selective fluid communication with the exhaust gas passageway 11. The ammonia delivery system 32 includes the ammonia storage device 30, at least one delivery valve 34, a first delivery passageway 36, a second delivery passageway 38, and a third delivery passageway 40. A first nozzle 42 injects ammonia from the first delivery passageway 36 into the exhaust gas passageway 11, and the second nozzle 44 injects ammonia from the second delivery passageway 38 into the exhaust gas passageway. The ammonia delivery system 32 may also include pressure regulators, tank heaters, and level sensors, among other devices. The at least one delivery valve 34 may comprise one or more valves that, when actuated, selectively permit the flow of ammonia from the third passageway 40 to either the first delivery passageway 36 or to the second delivery passageway 38, and ultimately to the exhaust gas passageway 11.

The aftertreatment system 10 may also include sensors, for example an exhaust gas temperature sensor 46, an intake air temperature sensor 48, an engine load information sensor 50, a throttle position sensor 52, an engine rpm sensor 54, an exhaust back-pressure sensor 56, an NOx sensor 58, among other types of sensors. A thermocouple 60 or other temperature sensor may be disposed at the NSC 20 to measure the NSC temperature, and a mixer 62 may be disposed upstream of the NSC to mix the exhaust gas (EG) and ammonia ($NH_3$).

The aftertreatment system 10 and method may be implemented by software on the vehicle, such as at an engine control unit (ECU) 64, however other controllers are possible. The ECU 64 calculates the amount of ammonia needed by reading the information supplied by the sensors 46-60, and comparing the values with one or more pre-programmed ECU maps. In the aftertreatment system 10 of FIG. 1, two pre-programmed ECU maps may be used.

$NH_3$ is dosed only upstream of the NPF 18 under the following condition: when the exhaust gas temperature at the NPF is generally above 160-degrees C. and the exhaust gas temperature at the inlet of the NSC 20 is generally below 160-degrees C., herein referred to as low-temperature conditions. Under the low temperature conditions, the at least one delivery valve 34 permits the flow of ammonia to the first delivery passageway 36, and dosing occurs at nozzle 42.

$NH_3$ is dosed at both upstream of the NPF 18 and upstream of the NSC 20 under the following condition: when the exhaust gas temperature at the NPF is generally below 550-degrees C. and the exhaust gas temperature at the inlet of the NSC is generally above 160-degrees C., herein referred to as intermediate-low temperature conditions. The dosing under intermediate-low conditions occurs at both nozzles 42 and 44.

$NH_3$ is dosed only upstream of the NSC 20 under the following condition: when the exhaust gas temperature at the NPF 18 is generally above 550-degrees C. and the exhaust gas temperature at the inlet of the NSC is generally under 550-degrees C., herein referred to as intermediate-high temperature conditions. Under intermediate-high conditions, the at least one delivery valve 34 permits the ammonia to flow only to the second delivery passageway 38 and to the exhaust gas passageway 11 between the NPF 18 and the NSC 20. The dosing under this condition occurs at nozzle 44.

$NH_3$ is not dosed at either nozzle 42 or nozzle 44 when the exhaust gas temperature at the NPF 18 is generally above 550-degrees C. and the exhaust gas temperature at the inlet of the NSC 20 is generally above 550-degrees C., herein referred to as high-temperature conditions. Exhaust gas temperatures exceed 550-degrees C. during active regeneration.

The temperatures given above for the low-temperature, intermediate-low temperature, intermediate-high temperature, and high temperature conditions may be variable and are not limited to the specific temperatures given above. The temperatures may be dependent on factors such as gas hourly space velocity (GHSV), temperatures in and out of the components, $NH_3$ storage level on each component, engine out NOx, vehicle duty cycle, among others.

After injection of ammonia into the exhaust gas passageway 11 upstream of the NSC 20 and downstream of the NPF 18, the ammonia and the NSC may have increased effectiveness in reducing NOx. The NSC 20, which was previously primarily used as a slip control catalyst, is used to reduce the NOx with the upstream injection of ammonia. Due to a higher washcoat loading of the NPF 18, the NSC 20 will more effectively reduce NOx.

If there is significant ammonia stored on the NPF 18 at the low temperature of exhaust gas, for example at the 160-250 degree Celsius range, when the NPF temperature is increased generally in the range of 300 degrees Celsius or greater, the stored ammonia may slip. The ECU 58 can control for this condition by decreasing the amount of ammonia injected from the second nozzle 44 upstream from the NSC 20 during and after the increase of temperature from the low temperature to the intermediate temperature at the NPF.

It is possible that the one or more delivery valves 34 can selectively open and close to permit the flow of ammonia to the exhaust gas passageway 11 on the basis of other conditions sensed by sensors 46-60, on the basis of additional conditions in combination with the exhaust gas temperature value, or any other conditions. Further, it is possible that the one or more delivery valves 34 can permit the injection of ammonia from the first and second nozzles 42, 44 simultaneously and in varying amounts. Additionally, the low, high and intermediate temperature values are exemplary values. Other values of low, high and intermediate temperatures can be used without departing from the invention.

What is claimed is:

1. A method for injecting ammonia into an exhaust gas stream downstream of a diesel engine, the method comprising:
providing an exhaust gas passageway from the diesel engine to an ambient, the exhaust gas passageway including an NOx Slip Catalyst (NSC) downstream of an NOx Particulate Filter (NPF);
emitting exhaust gas through the exhaust gas passageway; and
selectively injecting ammonia at least one of upstream of the NPF and upstream of the NSC dependent on the temperature of the exhaust gas at the NPF and at the NSC.

2. The method of claim 1 wherein the step of injecting ammonia upstream of the NPF occurs when the exhaust gas has a low temperature.

3. The method of claim 1 wherein the step of injecting ammonia upstream of the NPF and upstream of the NSC occurs when the exhaust gas has an intermediate-low temperature.

4. The method of claim 1 wherein the step of injecting ammonia upstream of the NSC occurs when the exhaust gas has an intermediate-high temperature.

5. The method of claim 1 wherein no ammonia is injected upstream of the NSC and upstream of the NPF when the exhaust gas has a high-temperature.

6. The method of claim 2 wherein the low-temperature generally comprises the exhaust gas temperature at the NPF of about greater than 160-degrees Celsius and the exhaust gas temperature at the NSC of about less than 160-degrees Celsius.

7. The method of claim 3 wherein the intermediate-low temperature generally comprises the exhaust gas temperature at the NPF of about less than 550-degrees Celsius and the exhaust gas temperature at the NSC of about greater than 160-degrees Celsius.

8. The method of claim 4 wherein the intermediate-high temperature generally comprises the exhaust gas temperature at the NPF of about greater than 550-degrees Celsius and the exhaust gas temperature at the NSC of about less than 550-degrees Celsius.

9. The method of claim 5 wherein the high-temperature generally comprises the exhaust gas temperature at the NPF of about greater than 550-degrees Celsius and the exhaust gas temperature at the NSC of about greater than 550-degrees Celsius.

10. The method of claim 1 further comprising the step of actuating at least one delivery valve to selectively permit the flow of ammonia to the exhaust gas passageway.

11. The method of claim 1 further comprising the step of sensing the temperature of the exhaust gas at the NPF, and communicating the value to an engine control unit (ECU).

12. An aftertreatment system for injecting ammonia into an exhaust gas stream downstream of a diesel engine, the system comprising:
an exhaust gas passageway for the flow of exhaust gas from the diesel engine to an ambient, the exhaust gas passageway including an NOx Slip Catalyst (NSC) in fluid communication with and downstream from an NOx Particulate Filter (NPF); and an ammonia delivery system in fluid communication with the exhaust gas passageway, the ammonia delivery system including an ammonia storage device (ASDS), and at least one delivery valve, wherein the at least one delivery valve selectively permits the flow of ammonia from the storage device to at least one of upstream of the NPF and upstream of the NSC dependent on the temperature of the exhaust gas at the NPF and the temperature of the exhaust gas at the NSC.

13. The aftertreatment system of claim 12 wherein the at least one delivery valve permits the flow of ammonia upstream of the NPF at least one of:

when the exhaust gas temperature at the NPF is about greater than 160-degrees Celsius and the exhaust gas temperature at the NSC is about less than 160-degrees Celsius; and when the exhaust gas temperature at the NPF is about less than 550-degrees Celsius and the exhaust gas temperature at the NSC is about greater than 160-degrees Celsius.

14. The aftertreatment system of claim 12 wherein the at least one delivery valve permits the flow of ammonia upstream of the NSC at least one of:

when the exhaust gas temperature at the NPF is about less than 550-degrees Celsius and the exhaust gas temperature at the NSC is about greater than 160-degrees Celsius; and when the exhaust gas temperature at the NPF is about greater than 550-degrees Celsius and the exhaust gas temperature at the NSC is about less than 550-degrees Celsius.

15. The aftertreatment system of claim 12 wherein the at least one delivery valve does not permit the flow of ammonia when the exhaust gas temperature at the NPF of about greater than 550-degrees Celsius and the exhaust gas temperature at the NSC of about greater than 550-degrees Celsius.

16. The aftertreatment system of claim 12 further comprising a diesel oxidation catalyst (DOC) located in upstream fluid communication with the NPF on the exhaust gas passageway.

17. The aftertreatment system of claim 12 further comprising a mixer disposed on the exhaust gas passageway downstream of the NPF and upstream of the NSC.

18. A method for injecting ammonia into an exhaust gas stream downstream of a diesel engine, the method comprising:

providing an exhaust gas passageway from the diesel engine to an ambient, the exhaust gas passageway including a diesel oxidation catalyst (DOC), an NOx Particulate Filter (NPF) downstream from the DOC, and an NOx Slip Catalyst (NSC) downstream of the NPF;

emitting exhaust gas through the exhaust gas passageway from the diesel engine to the ambient;

storing ammonia at an ammonia storage device (ASDS);

actuating at least one delivery valve to selectively permit the flow of ammonia to at least one of a first delivery passageway and a second delivery passageway;

injecting ammonia one of upstream of the NPF and upstream of the NSC.

19. The method of claim 18 wherein the step of injecting ammonia one of upstream of the NPF and upstream of the NSC is determined by the temperature of the exhaust gas.

20. The method of claim 18 further comprising mixing the exhaust gas with the ammonia with a mixer located between the NPF and the NSC.

\* \* \* \* \*